3,578,676
BENZIMIDAZOLE-2-CARBAMATES SUBSTITUTED ON THE BENZENE RING WITH AN ACYLOXYALKYL GROUP
George L. Dunn, Wayne, Pa., assignor to Smith Kline & French Laboratories, Philadelphia, Pa.
No Drawing. Filed June 21, 1968, Ser. No. 738,842
Int. Cl. C07d 49/38
U.S. Cl. 260—309.2
9 Claims

ABSTRACT OF THE DISCLOSURE

Benzimidazolyl carbamic acids and substituted on the benzene nucleus by carboxylated alkyl and alkoxy groups are disclosed as having activity against helminthiasis in animals. They may be prepared synthetically starting with an appropriate p-aminophenyl alkyl alcohol, proceeding through the alcoholic phenylene diamine to a hydroxyalkyl-2-carbomethoxyaminobenzimidazole.

---

This invention relates to anthelmintic compositions containing benzene ring substituted esters of benzimidazolyl carbamic acids, and to methods for producing anthelmintic activity using said esters.

According to one aspect of the invention, there are provided an anthelmintic composition and method of producing anthelmintic activity which utilizes as the essential active ingredient certain esters of benzimidazolyl carbamic acid represented by the general formula:

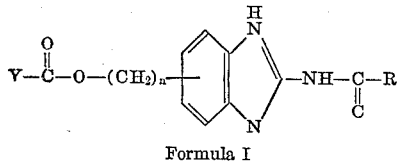

Formula I wherein:

R is alkyl straight or branched containing from one to six carbon atoms; cycloalkyl including alkyl cycloalkyl containing from three to six carbon atoms; alkenyl straight or branched chain containing from two to six carbon atoms; alkynyl straight or branched containing from two to six carbon atoms; phenyl; naphthyl, α or β; alkoxy straight or branched containing one to ten carbon atoms; cycloalkoxy, including alkylcycloalkoxy, containing 3 to 10 carbon atoms; alkenyloxy containing from two to ten carbon atoms; alkynyloxy containing from two to ten carbon atoms; phenyloxy; or naphthyloxy, α or β;

Y is alkyl straight or branched from one to six carbon atoms; cycloalkyl from three to six carbon atoms; alkenyl straight or branched from one to six carbon atoms; or alkynyl straight or branched from one to six carbon atoms, and n is a whole integer from one to eight.

It is preferred to use as the active ingredient of the novel compositions of this invention, compounds as shown in Formula II below:

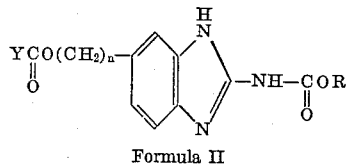

Formula II wherein:

R and Y are lower alkyl containing from one to three carbon atoms, and
n is a whole integer from one to five.

For example, a novel compound within Formulas I and II of good efficacy is 2-carbomethoxyamino-5-[3-acetoxypropyl]-benzimidazole which demonstrated 75.5% (replicated) reduction in worm burden (activity) against the mouse pinworm at 50 mg./kg., and 51% activity at 10 mg./kg.

The novel alcohol substituted o-phenylene diamine intermediates disclosed herein are also a part of this invention, by virtue of their use in making the anthelmintic esters of Formula I. These alcohols have the general structural formula:

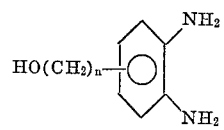

wherein: n is an integer from one to eight.

Examples of specific compounds falling within Formula I are:

2-carbomethoxyamino-5-[3-acetoxypropyl]-benzimidazole
2-acetamido-5-[3-acetoxypropyl]-benzimidazole
2-carboethoxyamino-5-[2-acetoxyethyl]-benzimidazole
2-propionamido-5-[2-acetoxyethyl]-benzimidazole
2-carbobutoxyamino-5-[1-acetoxymethyl]-benzimidazole
2-butyramido-5-[1-acetoxymethyl]-benzimidazole
2-carbobutoxyamino-5-[1-acetoxymethyl]-benzimidazole
2-valeramido-5-[1-acetoxymethyl]-benzimidazole
2-carboamyloxyamino-5-[3-propionyloxypropyl]-benzimidazole
2-caproylamido-5-[3-propionyloxypropyl]-benzimidazole
2-carbohexyloxyamino-5-[4-butyryloxybutyl]-benzimidazole
2-heptanoylamido-5-[4-butyryloxybutyl]-benzimidazole
2-carbocyclopropyloxyamino-5-[3-butyryloxypropyl]-benzimidazole
2-cyclopropylamido-5-[3-butyryloxypropyl]-benzimidazole
2-carbocyclobutyloxyamino-5-[2-propionyloxyethyl]-benzimidazole
2-cyclobutaneamido-5-[2-propionyloxyethyl]-benzimidazole
2-carbocyclopentyloxyamino-5-[1-acetoxymethyl]-benzimidazole
2-cyclopentaneamido-5-[1-acetoxymethyl]-benzimidazole
2-carbocycloheptyloxyamino-5-[3-acetoxypropyl]-benzimidazole
2-cyclohexaneamido-5-[3-acetoxypropyl]-benzimidazole
2-carbocyclohexyloxyamino-5-[4-propionyloxybutyl]-benzimidazole
2-cycloheptaneamido-5-[4-propionyloxybutyl]-benzimidazole
2-carboethoxyamino-5-[3-cyclopropylcarboxypropyl]-benzimidazole
2-propionamido-5-[3-cyclopropylcarboxypropyl]-benzimidazole
2-carbopropoxyamino-5-[2-allylcarboxyethyl]-benzimidazole
2-butyramido-5-[2-allylcarboxyethyl]-benzimidazole
2-carbobutoxyamino-5-[dimethallylcarboxymethyl]-benzimidazole
2-valeramido-5-[dimethallyloxymethyl]-benzimidazole
2-carbophenoxyamino-5-[3-acetoxypropyl]-benzimidazole
2-phenoxamido-5-[3-acetoxypropyl]-benzimidazole
2-carbonaphthyloxyamino-5-[2-propionyloxyethyl]-benzimidazole 2-naphthylamido-5-[2-propionyloxyethyl]-benzimidazole
2-carbohexyloxyamino-5-acetoxymethylbenzimidazole
2-heptanoylamido-5-acetoxymethylbenzimidazole
2-carboamyloxyamino-5-[2-butyryloxyethyl]-benzimidazole
2-caproylamido-5-[2-butyryloxyethyl]-benzimidazole
2-carbobutoxyamino-5-[3-propargylcarboxypropyl]-benzimidazole
2-valeramido-5-[3-propargylcarboxypropyl]-benzimidazole
2-carbopropoxyamino-5-[4-vinylcarboxybutyl]-benzimidazole
2-butyramido-5-[4-vinylcarboxybutyl]-benzimidazole
2-carboethoxyamino-5-[5-methallylcarboxyamyl]-benzimidazole
2-propionamido-5-[5-methallylcarboxyamyl]-benzimidazole
2-carbomethoxyamino-5-[6-ethinylcarboxyhexyl]-benzimidazole
2-acetamido-5-[6-ethinylcarboxyhexyl]-benzimidazole
2-carbovinyloxyamino-5-[4-cyclopropylcarboxybutyl]-benzimidazole
2-vinylamido-5-[4-cyclopropylcarboxybutyl]-benzimidazole
2-carboallyloxyamino-5-[3-cyclobutylcarboxypropyl]-benzimidazole
2-allylamido-5-[3-cyclobutylcarboxypropyl]-benzimidazole
2-carbomethallyloxyamino-[2-cycloamylcarboxyethyl]-benzimidazole
2-methallyamido-[2-cycloamylcarboxyethyl]-benzimidazole
2-carbodimethallyloxyamino-5-[cyclohexylcarboxymethyl]-benzimidazole
2-dimethallylamido-5-[cyclohexylcarboxymethyl]-benzimidazole
2-carbopropargyloxyamino-5-[5-acetoxyamyl]-benzimidazole
2-propargylamino-5-[5-acetoxyamyl]-benzimidazole
2-carbobutynoxyamino-5-[4-propionyloxybutyl]-benzimidazole
2-butyramido-5-[4-propionyloxybutyl]-benzimidazole
2-carbopentynoxyamino-5-[3-butyryloxypropyl]-benzimidazole
2-pentynamido-5-[3-butyryloxypropyl]-benzimidazole
2-carbohexynoxyamino-5-[2-valeryloxyethyl]-benzimidazole
2-hexynamido-5-[2-valeryloxyehyl]-benzimidazole
2-carbocyclopropyloxyamino-5-[2-hexanoyloxyethyl]-benzimidazole
2-cyclopropylamido-5-[2-hexanoyloxyethyl]-benzimidazole
2-carbocyclobutyloxyamino-5-[2-actoxyethyl]-benzimidazole
2-cyclobutylamido-5-[2-acetoxyethyl]-benzimidazole The compounds of Formula I wherein R is alkoxy, and Y is alkyl may be prepared starting with the appropriate p-aminophenyl alkyl alcohol. This intermediate is acylated with an appropriate anhydride, followed by nitration with red fuming nitric acid, to give the corresponding 3-nitro-N, O-diacyl (aminophenyl)-alkyl alcohol. Hydrolysis gives the corresponding 3-nitro-p-aminophenyl alkyl alcohol. This latter intermediate is reduced to yield an alcohol substituted o-phenylenediamine. The diamine intermediate is converted, by the later-detailed thiourea sulfate process, which employs 2-methyl-2-thiopseudourea sulfate and methyl chloroformate, to the corresponding 2-carboalkoxyamino-5-hydroxyalkylbenzimidazole, which is, in turn, acylated with an anhydride or an acid chloride in a non-polar solvent, like pyridine, to yield the corresponding 5-acyloxyalkyl derivative of 2-carbomethoxyaminobenzimidazole.

The compounds of Formula I in which R is a alkyloxy, and Y is cycloalkyl are prepared, again starting with a p-aminophenyl alkyl alcohol, and treating in the manner just described until the final step of esterifying the 5-hydroxy alkyl compound, there upon substituting a cycloalkyl acid chloride to yield a 5-cycloalkylcarboxyalkyl derivative.

Similarly, when Y is alkyl and R is alkenyloxy or alkynyloxy, the compounds are prepared in like manner except by using a thiourea reagent having terminal alkenyl or alkynyl moieties, in which the double or triple bonds thereof are not conjugated with the C—X' or C=O moiety.

The compounds of I in which Y is alkyl, and R is cycloalkyloxy are also prepared by the thiourea sulfate process, except that reagent contains a terminal cycloalkyl moiety in place of a linear or branched alkyl moiety.

The compounds of I in which Y is cycloalkyl, and R is also cycloalkyloxy are also prepared by the same process, employing a thiourea sulfate reagent with terminal cycloalkyl moieties to form the 5-hydroxyalkyl-2-carbomethoxyaminobenzimidazole intermediate, followed by esterification with a cycloalkyl acid chloride to yield 2,5-dicycloalkyl derivatives.

Compounds of Formula I in which Y is cycloalkyl and R is alkenyloxy or alkynyloxy, the compounds are similarly prepared as described above, using thiourea sulfates wherein the terminal groups are cycloalkyl moieites, and the esterification step is carried out using unsaturated acyl anhydrides or acid chlorides to yield 5-cycloalkylcarboxyalkyl-2-carboalkenyloxy (or alkynyloxy) aminobenzimidazole.

The compounds of Formula I wherein R is alkyl, and Y is alkyl are conveniently prepared by starting with cyanamide, and reacting it with a selected acyl halide in pyridine, or other organic solvent, followed by reaction with the appropriate alcoholic o-phenylenediamine, to give the corresponding benzene ring substituted 2-alkamidobenzimidazole.

The compounds of Formula I in which R is alkyl, and Y is cycloalkyl are prepared, again starting with an alcohol substituted o-phenylenediamine, and treating in the manner just described, until the final esterification step, but substituting a cycloalkyl anhydride or acid chloride to yield a 2-cycloalkylamido derivative of a 5-acyloxyalkyl benzimidazole.

Similarly, when Y is alkyl, and R is alkenyl or alkynyl, the compounds are prepared in like manner except by using in the initial acylation acid chloride reagent having terminal alkenyl or alkynyl moieties, in which the double or triple bonds thereof are not conjugated with the C=O moiety.

The compounds of I in which Y is alkyl and R is cycloalkyl are also prepared by the cyanamide process, except that the acyl halide reagent contains a terminal cycloalkyl moiety in place of a linear or branched alkyl moiety.

The compounds of I in which Y is cycloalkyl, and R is also cycloalkyl are also prepared by the same process, employing an anhydride or acid chloride reagent having terminal cycloalkyl moieties to form the 5-hydroxyalkyl-2-cycloalkylamido benzimidazole intermediate, followed by esterification with a cycloalkyl acid chloride to yield the 2,5-dicycloalkyl derivatives.

Compounds of Formula I in which Y is cycloalkyl and R is alkenyl or alkynyl, the compounds are similarly prepared as described above, using acid chlorides wherein the terminal groups have alkenyl or alkynyl moieties, and the esterification step is carried out using a cycloalkyl anhydride, or acid chloride, to yield 5-cycloalkylcarboxyalkyl-2-alkenyl-(or 2-alkynyl) amidobenzimidazole.

A suitable process for making the anthelmintic compound for this invention employs a S-lower alkyl pseudo thiourea sulfate in the condensation step. The appropriate sulfate is treated with one to two equivalents of a lower alkyl halo formate in aqueous solution, and then by condensing with a suitable alcohol substituted o-phenylenediamine, it yields the corresponding 2-carboxyamino-5-hydroxyalkyl benzimidazole.

The o-phenylenediamine reactants have alkyl alcohol substituents on the benzene ring which correspond to the benzimidazole of the final product as defined in Formula I. The resulting benzimidazoles bear the substituents at the corresponding position of the benzene ring, which by suitable esterification are converted to the herein claimed anthelmintic compounds. The nature of the condensation reaction is such that it is generally applicable to o-phenylenediamines, regardless of the carbon chain length of the alkyl alcohol which appears on its benzene ring.

It will be readily apparent to one skilled in this art that certain of the substituted 2-aminobenzimidazole compounds (R or Y is branched) of this invention may have asymmetric carbon atoms, forming optically active $d$- and $l$-compounds. The connotation of the general formulas presented herein is intended to include the separated $d$- or $l$-optical isomers, as well as racemic mixtures of these isomers.

If desired, the isomers may be separated for individual use by resolution methods known to the art, such as fractional crystallization of the $l$-tartrate salts of the carbamates. Alternatively, a synthesis starting with an optically active side chain may yield the desired optical isomer.

The compounds of Formula I being weak bases will normally form salts with inorganic and organic acids. Accordingly, the nontoxic salts formed with pharmaceutically acceptable strong inorganic and organic acids may be alternatively employed in the compositions of the invention. Other nontoxic molecular complexes known to exist that can be derived from compounds of Formula I may also be used in this invention, since the anthelmintic activity rests in the benzimidazolyl carbamic acid structure itself.

Benzimidazolyl carbamates of Formula I have been found to possess useful anthelmintic properties, that is, broad spectrum activity against parasites of warm blooded animals, including both mature and immature parasitic forms. In particular, these compounds have been found to exhibit activity against various helmintic infections of the intestinal tract of economically important animals, coupled with low systemic toxicity to the host animal.

For example, the disclosed compounds are generally effective in clearing mice of worm infections for laboratory purposes, among others: *Syphacia obvelata* and *Aspicularis tetraptera* (mouse pinworm).

Other susceptible helminths include *Toxocara canis*, found in naturally infested dogs. Also, parasitic to this host are *Ancylostoma canium*, *Trichuris vulpis* (whipworm), and *Phsalaptera* spp.

Compounds of Formula I are efficacious against parasitic gastroenteritis in sheep, such as *Haemonchus contortus*, Ostertagia spp., Trichostrongylus spp., Nematodirus spp., *Trichuris ovia*, Cooperia spp., and *Strongyloides papillosus*. *Bunostomum trigonocephalum* and Oesophagostomum spp., are other important parasites of sheep.

Animals of low weight are treated with unit doses ranging no higher than a few milligrams; whereas animals of high body weight, such as ruminants, require proportionately larger unit doses ranging up to several grams. Preferably, a single dose is administered daily for each animal species based on the weight of that species.

The amount of ingredient administered will depend on the weight of the host, but will usually be between about 1 mg./kg. and 500 mg./kg. of body weight daily.

For example, 2-carbomethoxyamino-5 - [3 - acetoxypropyl]benzimidazole at an oral daily dose of 50 mg./kg. (replicated) tested in clearing mice of natural pinworm infection, following generally the method of McCowen et al., reported in the American Journal of Tropical Medicine, 6, 894 (1957), gave a 75.5% result in terms of worms cleared. At 10 mg./kg., showed a 51% reduction in the pinworm burden. Its $LD_{50}$ in mice exceeds 500 mg./kg.

In practice, a phamacologically active compound of strucaural Formula I is usually formulated with a nontoxic carrier therefore to give anthelmintic compositions of this invention. The carrier may be an orally ingestible container for the active ingredient, for example, a hard or soft gelatin capsules; or it may be a pharmaceutically acceptable diluent or excipient of the kind normally used in the production of medicaments, ready for use, for example maize starch, terra alba, lactose, sucrose, calcium phosphate, gelatin, talcum, stearic acid, magnesium stearate, dextrin, agar, pectin or acacia.

Exemplary of liquid carriers are peanut oil, olive oil, sesame oil, and water. Similarly, the carrier or diluent may include a time material such as glyceryl monostearate or glyceryl distearate alone or with a wax.

A wide variety of pharmaceutical forms can be employed. Thus, if a solid carrier is used, the preparation can be tableted, placed in a hard gelatin capsule, or compounded in the form of a troche or lozenge. The amount of solid carrier will vary widely but preferably will be from about 25 mg. to about 3 gm. If a liquid carrier is used, the preparation may be in the form of a soft gelatin capsule, placed in an ampule or in liquid suspension.

The compositions are most often made up in a form suitable for internal administration and may therefore take the form of a liquid, for example, an emulsion or a sterile solution or suspension in water, oil, such as arachis oil, or other liquid.

The compositions are advantageously made up in a dosage unit form adapted for the desired mode of administration. Thus, for the preferred oral administration the dosage unit may take the form of a suspension, tablet, packaged powder, bolus, or encapsulated powder. The quantity of active ingredient in each dosage unit will be such that one or more units are required for each therapeutic administration.

As previously mentioned, the compounds of Formula I have general anthelmintic activity and accordingly a further and most important aspect of this invention provides a method of treating helmintic infections in an animal which comprises administering, usually orally, to the animal in a sufficient nontoxic, but effective, dose an anthelmintic compound falling within the definition of Formula I, generally in the form of a pharmaceutical or veterinary composition as hereinbefore described. The daily dose range commonly used is from about 1 mg./kg. to about 500 mg./kg. depending on the species of host and regimen used. One dose per day administration is preferred but up to five of the dosage units described above may be used if desired.

Where tableting is used, the resulting tablets are then coated with methyl methacrylate to form an enteric coating, i.e. a coating which is substantially insoluble in gastric secretion but substantially soluble in intestinal fluids.

It will be appreciated that the actice ingredient used in the formulation of the tablets described above may be replaced with other compounds of Formula I having the necesary anthelmintic activity. Furthermore, other materials may be used to form the enteric coating, for example other synthetic plastic materials such as methyl acrylate, cellulose derivatives, hydrogenated caster oil or phthalates.

The compositions thusly prepared are administered, usually orally, to an infected host from 1–5 times daily for anthelmintic activity.

The following examples illustrate syntheses which may be employed in formulating the compositions of the invention but are not considered limiting the invention described herebefore.

EXAMPLE 1

Preparation of 2-carbomethoxyamino-5-(3-acetoxypropyl) benzimidazole 3-(p-aminophenyl)propyl alcohol (13 g., 0.09 mole) and 10.1 g. (0.099 mole) of acetic anhydride are admixed with stirring and heated at reflux for 30 minutes. Acetyl chloride (7.8 g.) is added, and the mixture is refluxed for an added hour. The mixture is evaporated in vacuo to give a solid residue. The residue is dissolved in 43 ml. of acetic anhydride and then 10.5 ml. of 70% $HNO_3$ is added dropwise, over 45–50 minutes with stirring. The exothermic reaction temperature is maintained between 9° and 11° C., by occasional cooling with a Dry Ice-water acetone bath. After stirring for an added 15 minutes at 10° C., the mixture is poured into 400 ml. of $H_2O$ at 0° C., and after stirring for 30 minutes a yellow brown solid is filtered off, and air dried overnight.

This crude material (the nitroamino-diacyl derivative of the starting material) weighs 19 g., M.P. 73–76° C.

The aforedescribed intermediate is suspended in 350 ml. of 10% aqueous NaOH and the mixture refluxed for 2.5 hours, cooled, and extracted with ether several times. After filtration, the solvent is evaporated. An infrared spectrum indicates, cleavage of the acetyl groups, giving the 4-amino-3-nitrophenyl propyl alcohol.

The above disubstituted phenylpropyl alcohol (7.6 g.) is dissolved in 200 ml. ethanol, 1.5 g. of palladium catalyst (5% by weight on charcoal) is added, and the mixture is shaken under 60 p.s.i. hydrogen (initial) at room temperature for two hours in a Paar apparatus.

The catalyst is removed by filtration on "Supercel." The filtrate is evaporated to dryness, giving 6.3 g. of a purplish looking semi-solid, whose infrared spectrum is consistent wtih diaminophenyl propyl aclohol.

To 12.4 g. (0.163 mole) of thiourea in 6.2 ml. of water, is added, dropwise, 14 g. (0.11 mole) of dimethyl sulfate with stirring. The mixture becomes warm and colorless, and is refluxed gently for 30 minutes, during which time a white crystalline solid appears. The reaction mixture is then cooled at 20° C., yielding 2-methyl-2-thiopseudourea sulfate.

Methylchloroformate (7.18 g., 0.076 mole) is added in one portion to 10.56 g. of 2-methyl-2-thiopseudourea sulfate. To this mixture is added about 12 ml. of 25% aqueous NaOH, at a rate which maintains the temperature no higher than 5° C., with a resulting pH of 7.0–7.5. Acetic acid (5 ml.) then is slowly added bringing the pH to 5.0–5.5. 4-hydroxypropyl-o-phenylenediamine (6.2 g., .037 mole) dissolved in 25 ml. of 50% aqueous ethanol is added in one portion, then the mixture is slowly warmed until reaching a gentle reflux temperature at 85° C., and is refluxed for an additional 30 minutes.

The precipitate which forms is filtered off after cooling the reaction, washed with cold 50% aqueous ethanol and allowed to dry overnight, yielding 7.3 g. of a tan crude product.

The product is recrystallized from 400 ml. of 50% aqueous ethanol, and then from anhydrous ethanol to give, after air drying, 2.1 g. of 2-carbomethoxyamino-5-(3-hydroxypropyl)-benzimidazole, M.P. of 285° (d.).

To a flask equipped with a magnetic stirring bar and condenser, the substituted benzimidazole (0.5 g., 0.002 mole), 0.61 g. of acetic anhydride, and 12 ml. of pyridine are added. Upon stirring for one hour, the solid goes into solution, and is allowed to stir overnight. The solution is poured into 200 ml. of water, the pH (6.0) of the resulting cloudy mixture is adjusted to 5.0–5.5 with glacial acetic acid causing more solid to precipitate.

After several hours, the solid is collected and recrystallized from 95% ethanol (denatured with methanol), yielding the desired end product, methyl-5-(3-acetoxypropyl)-2-benzimidazolyl-carbamate, 0.45 g., M.P. 205–207° C.

EXAMPLE 2

When the following substituted o-phenylenediamines are substituted for the 4-hydroxypropyl-o-phenylenediamine in the procedure of Example 1, the corresponding listed products are obtained:

| Starting material | Products |
|---|---|
| 4-(2-hydroxyethyl)-o-phenylenediamine. | 2-carbomethoxyamino-5-[2-acetoxyethyl]-benzimidazole. |
| 4-hydroxymethyl-o-phenylenediamine. | 2-carbomethoxyamino-5-[1-acetoxymethyl] benzimidazole. |
| 4-(4-hydroxybutyl)-o-phenylenediamine. | 2-carbomethoxyamino-5-[4-acetoxybutyl]-benzimidazole. |
| 4-(5-hydroxyamyl)-o-phenylenediamine. | 2-carbomethoxyamino-5-[5-acetoxyamyl]-benzimidazole. |
| 4-(6-hydroxyhexyl)-o-phenylenediamine. | 2-carbomethoxyamino-5-[6-acetoxyhexyl]-benzimidazole. |

EXAMPLE 3

When the following substituted acyl anhydrides and/or o-phenylenediamine (PDA) substituted for the acetic anhydride in the procedures of Examples 1 and 2, corresponding listed products are obtained:

| Starting material | Products |
|---|---|
| 4-hydroxymethyl-o-PDA and propionyl anhydride. | 2-carbomethoxyamino-5-[1-propionyloxymethyl]-benzimidazole. |
| 4-(2-hydroxyethyl)-o-PDA and propionyl anhydride. | 2-carbomethoxyamino-5-[2-propionyloxyethyl]-benzimidazole. |
| 4-(3-hydroxypropyl)-o-PDA and propionyl anhydride. | 2-carbomethoxyamino-5-[3-propinyloxypropyl]-benzimidazole. |
| (4-hydroxybutyl)-o-PDA and propionyl anhydride. | 2-carbomethoxyamino-5-[4-propionyloxybutyl]-benzimidazole. |
| 4-(5-hydroxyamyl)-o-PDA and propionyl anhydride. | 2-carbomethoxyamino-5-[5-propionyloxyamyl]-benzimidazole. |
| (4-hydroxymethyl)-o-PDA and butyryl anhydride. | 2-carbomethoxyamino-5-[1-butyryloxymethyl]-benzimidazole. |
| 4-(2-hydroxyethyl)-o-PDA and butyryl anhydride. | 2-carbomethoxyamino-5-[2-butyryloxyethyl]-benzimidazole. |
| 4-(3-hydroxypropyl)-o-PDA and butyryl anhydride. | 2-carbomethoxyamino-5-[3-butyryloxypropyl]-benzimidazole. |
| 4-(4-hydroxybutyl)-o-PDA and butyryl anhydride. | 2-carbomethoxyamino-5-[4-butyryloxybutyl]-benzimidazole. |
| 4-(5-hydroxyamyl)-o-PDA and butyryl anhydride. | 2-carbomethoxyamino-5-[5-butyryloxyamyl]-benzimidazole. |

EXAMPLE 4

When the following acyl halides are combined with S-lower alkyl pseudothiourea sulfate in place of the methyl chloroformate of Example 1, the corresponding listed products are obtained:

| Starting material | Products |
|---|---|
| Allyl chloroformate [1] | 2-carboallyloxyamino-5-[3-acetoxypropyl]-benzimidazole. |
| 2-methyallylchloroformate (C.A. 46:8417 g.). | 2-carbomethallyloxamino-5-[3-acetoxypropyl]-benzimidazole. |
| Vinylchloroformate (U.S. Pat. 2,377,085). | 2-carbovinyloxyamino-5-[3-acetoxypropyl]-benzimidazole. |
| Cyclopropylchloroformate | 2-carbocyclopropyloxyamino-5-[3-acetoxypropyl]-benzimidazole. |
| Cyclobutylchloroformate | 2-carbocyclobutyloxyamino-5-(3-acetoxypropyl)-benzimidazole. |
| Cyclopentylchloroformate (C.A. 50:4046a, 8477d). | 2-carbocyclopentyloxyamino-5-[3-acetoxypropyl]-benzimidazole. |
| 1-naphthylchloroformate [1] | 2-carbonaphthyloxy-5-[3-acetoxypropyl]-benzimidazole. |
| Phenylenechloroformate [1] | 2-carbophenyloxyamino-5-[3-acetoxypropyl]-benzimidazole. |

[1] Available from Chemetron Corp., Chicago, Ill.

EXAMPLE 5

Preparation of 2-isobutyramido-5-[3-acetoxypropyl]-benzimidazole 4-(3-hydroxypropyl)-o-phenylenediamine, prepared as described in Example 1, and 1 g. cyanamide are reacted in the following manner: A cold (0–50° C.) solution of cyanamide (1.0 g., 0.0238 mole) in 20 ml. of dry pyridine is treated dropwise with isobutyryl chloride (2.53 g., 0.0238 mole). When addition is complete, the dark red mixture is stirred for 10 minutes at 0–5° C., and then for 35 minutes at room temperature. The 4-(3-hydroxypropyl)-o-phenylenediamine (7.9 g., 0.0476 mole) was added in one portion; the mixture is allowed to stir 35 minutes at room temperature and then is heated on a steam bath for 2.5 hours. The mixture is cooled in ice, diluted with 20 ml. of water, and the precipitated solid is collected. The solid is washed well with water and dried at 60° C., to give a good yield of 5-(3-hydroxypropyl)-isobutyramidobenzimidazole.

To a flask equipped with a magnetic stirring bar and condenser, the substituted benzimidazole (0.5 g., 0.002 moles) 0.61 g. of acetic anhydride, and 12 ml. of pyridine are added. Upon stirring for one hour, the solid goes into solution and then the solution is allowed to stir overnight. The solution is poured into 200 ml. of water, the pH (6.0) of the resulting cloudy mixture is adjusted to 5.0–5.5 with glacial acetic acid, causing more solid to precipitate.

After several hours, the solid is collected and recrystallized from 95% ethanol yielding the desired end product, 2-isobutyramido-5-[3-acetoxypropyl]-benzimidazole.

EXAMPLE 6

When the following substituted o-phenylenediamines are used in place of the 4-hydroxypropyl-o-phenylenediamine in the procedure of Example 5, the corresponding listed products are obtained.

| Starting material | Products |
|---|---|
| 4(2-hydroxyethyl)-o-phenylenediamine. | 2-acetamido-5-[2-acetoxyethyl]-benzimidazole. |
| 4-hydroxymethyl-o-phenylenediamine. | 2-acetamido-5-[1-acetoxymethyl]-benzimidazole. |
| 4(4-hydroxybutyl)-o-phenylenediamine. | 2-acetamido-5-[4-acetoxybutyl]-benzimidazole. |
| 4(5-hydroxyamyl)-o-phenylenediamine. | 2-acetamido-5-[5-acetoxyamyl]-benzimidazole. |
| 4(6-hydroxyhexyl)-o-phenylenediamine. | 2-acetamido-5-[6-acetoxyhexyl]-benzimidazole. |

EXAMPLE 7

When the following acyl halides are combined with cyanamide in place of the isobutyryl chloride of Example 5, the corresponding listed products are obtained:

| Starting material | Products |
|---|---|
| Allyl chloroformate [1] | 2-allylamido-5-[3-acetoxypropyl]-benzimidazole. |
| 2-methallylchloroformate (C.A. 46:8417 g.). | 2-methallylamido-5-[3-acetoxypropyl]-benzimidazole. |
| Vinylchloroformate (U.S. Pat. 2,377,085). | 2-vinylamido-5-[3-acetoxypropyl]-benzimidazole. |
| Cyclopropylchloroformate | 2-cyclopropylamido-5-[3-acetoxypropyl]-benzimidazole. |
| Cyclobutylchloroformate | 2-cyclobutylamido-5-[3-acetoxypropyl]-benzimidazole. |
| Cyclopentylchloroformate (C.A. 50:4046a, 8477.). | 2-cyclopentylamido-5-[3-acetoxypropyl]-benzimidazole. |
| 1-Naphthylchloroformate [1] | 2-naphthylamido-5-[3-acetoxypropyl]-benzimidazole. |
| Phenylchloroformate [1] | 2-benzamido-5-[3-acetoxypropyl]-benzimidazole. |

[1] Available from Chemetron Corp., Chicago, Ill.

EXAMPLE 8

Typical cattle bolus containing an anthelmintic described herein

Typical cattle bolus containing an anthelmintic described herein

| | Grams |
|---|---|
| 2-carbomethoxyamino-5 - [3-acetoxy propyl]-benzimidazole | 2.0 |
| Calcium phosphate | 2.5 |
| Maize starch | 0.54 |
| Talcum | 0.14 |
| Gum arabic | 0.15 |
| Magnesium stearate | 0.05 |

The calcium phosphate and the anthelmintic compound are thoroughly mixed, and the mixture reduced to a particle size finer than 60 mesh. About one-half of the starch is added, as an aqueous paste, and the resulting mixture granulated. The granules are passed through a #10 mesh screen and dried at 110–130° F. for about 8 hours. The dried materials then passed through a #16 mesh screen. The guar gum and the balance of the starch are added and the mixture thoroughly blended. Finally, the remainder of the ingredients are added and the entire mass thoroughly mixed and compressed into a bolus. The magnesium stearate, talcum and gum acacia are of a particle size to pass a #10 mesh screen.

EXAMPLE 9

Typical sheep drench containing an anthelmintic described herein

| | Parts by wt. |
|---|---|
| 2-carbomethoxyamino-5 - [3-acetoxypropyl]-benzimidazole | 60 |
| Terra Alba English | 35.5 |
| Tragacanth, U.S.P. | 3.0 |
| Sodium lauryl sulfate | 1.5 |
| Water | |

What is claimed is:
1. A compound of the formula

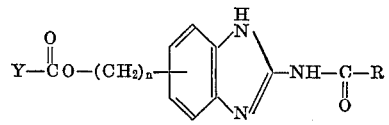

wherein
R is straight chain alkoxy of 1 to 10 carbon atoms, branched chain alkoxy of 3 to 10 carbon atoms, cycloalkoxy of 3 to 10 carbon atoms, alkenyloxy of 2 to 10 carbon atoms, alkynyloxy of 2 to 10 carbon atoms, phenoxy, or naphthyloxy, α or β;
Y is alkyl of 1 to 6 carbon atoms, cycloalkyl of 3 to 10 carbon atoms, straight chain alkenyl or alkynyl of 2 to 10 carbon atoms, or branched chain alkenyl or alkynyl of 3 to 10 carbon atoms; and
n is an integer from 1 to 8.

2. A compound according to claim 1 wherein R is lower alkoxy from one to three carbons, the benzene ring is 5-substituted, Y is lower alkyl from one to three carbon atoms; and n is a whole integer from one to five.

3. A compound of claim 2 wherein the compound is, 2-carbomethoxyamino-5 - (3 - acetoxypropyl)-benzimidazole.

4. A compound of claim 2 wherein the compound is 2-carboethoxyamino-5-[2 - acetoxyethyl]-benzimidazole.

5. A compound of claim 2 wherein the compound is 2-carbopropoxyamino-5 - [1 - acetoxymethyl]benzimidazole.

6. A compound of claim 1 wherein the compound is 2-carbobutoxyamino-5 - [1 - acetoxymethyl]-benzimidazole.

7. A compound of claim 1 wherein the compound is 2-carbocyclopropyloxyamino-5 - [3 - butyryloxypropyl]-benzimidazole.

8. A compound of claim 1 wherein the compound is 2-carboallyloxyamino-5 - [3 - cyclobutylcarboxypropyl]-benzimidazole.

9. A compound of claim 1 wherein the compound is 2-carbovinyloxyamino-5 - [4 - cyclopropylcarboxybutyl]-benzimidazole.

References Cited

UNITED STATES PATENTS 3,010,968  11/1961  Loux  260—309.2

FOREIGN PATENTS 58,510  9/1967  Germany  260—309.2

NATALIE TROUSOF, Primary Examiner

U.S. Cl. X.R.

260—575; 424—273